July 2, 1963     J. DE HAAN ET AL     3,096,326
PREPARATION OF ᴀ-NITRO ε-CAPROLACTAM
Filed Feb. 19, 1962
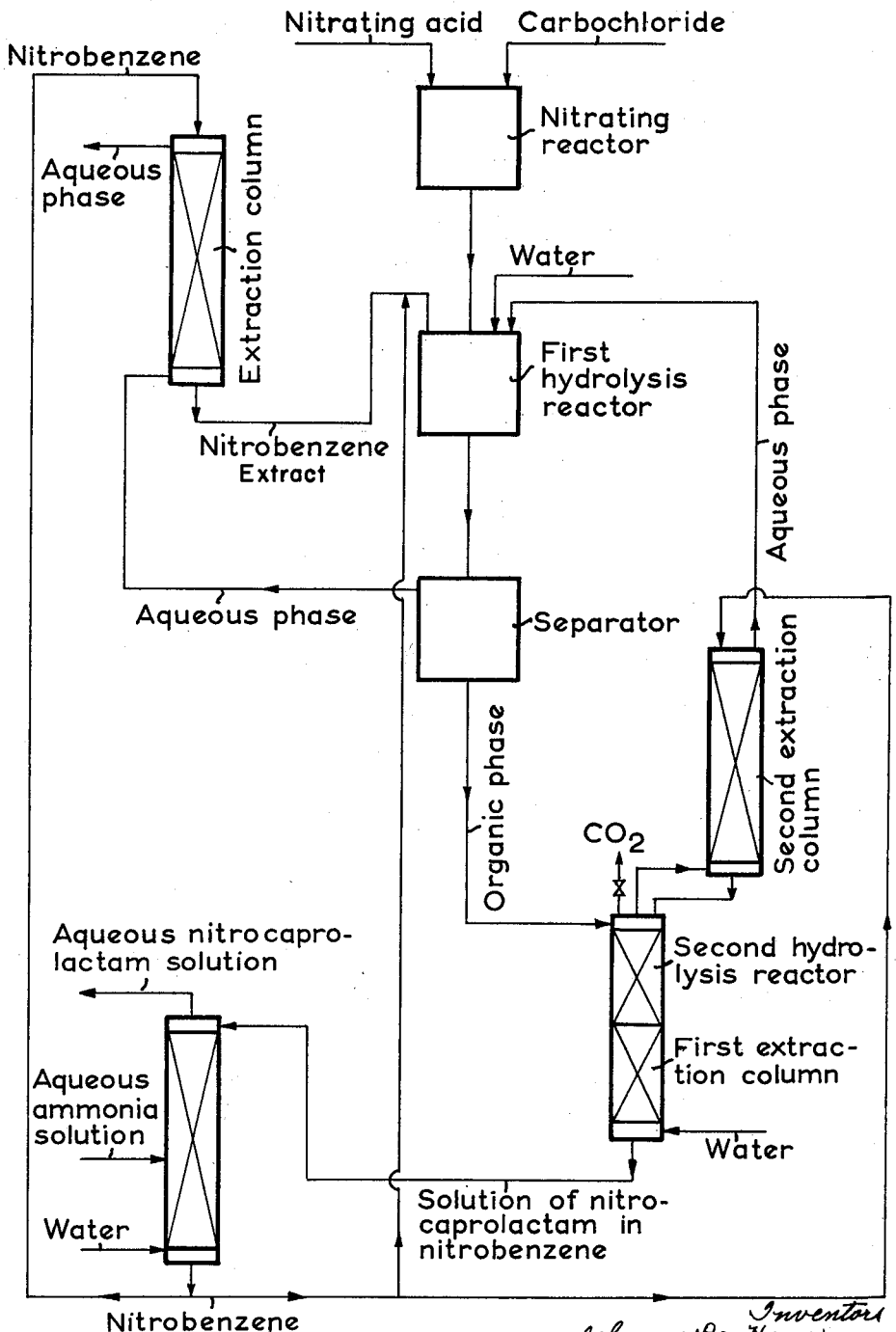
Inventors
Johannes De Haan
Johan P. H. Von Den Hoff
By Cushman, Darby & Cushman
Attorneys

3,096,326
PREPARATION OF α-NITRO ε-CAPROLACTAM
Johannes de Haan and Johan P. H. Von Den Hoff, Geleen, Netherlands, assignors to Stamicarbon N.V., Heerlen, Netherlands
Filed Feb. 19, 1962, Ser. No. 173,885
Claims priority, application Netherlands Feb. 22, 1961
6 Claims. (Cl. 260—239.3)

The present invention relates to a process for the preparation of α-nitro ε-caprolactam. This substance is important as an intermediate product in the synthesis of lysine, one of the essential amino acids, which can be obtained therefrom by hydrogenation and subsequent hydrolysis.

It has already been proposed to prepare α-nitro ε-caprolactam by nitration of 2-chloroazacyclo 2,3-heptene 1-carbochloride and hydrolysis of the nitration product in two steps. In the first step the reaction mixture obtained after the nitration is contacted with water at a temperature below 50° C. as a result of which the nitration product is converted to the water-insoluble 3-nitroazacycloheptane-2-one 1-carbochloride. This substance is separated off and, in the second step, further hydrolyzed with fresh water to α-nitro ε-caprolactam at a temperature above 50° C. (see Belgian Patents 582,992 and 583,116).

It has now been found that the preparation of α-nitro ε-caprolactam on a technical scale can be realized in a much simpler manner if the hydrolysis is carried out in a water-immiscible organic solvent for 3-nitroazacycloheptane-2-one 1-carbochloride.

The process according to the invention for the preparation of α-nitro ε-caprolactam by nitration of 2-chloroazacyclo 2,3-heptene 1-carbochloride and hydrolysis of the nitration product in two steps, in which in the first step 3-nitroazacycloheptane-2-one 1-carbochloride is formed, which substance in the second step is hydrolyzed further into α-nitro ε-caprolactam, is characterized in that the first step is carried out in a water-immiscible organic solvent for 3-nitroazacycloheptane-2-one 1-carbochloride, after which the resulting liquid is separated into an aqueous and an organic phase and the latter phase is re-contacted with water in the second step.

The nitration can be carried out in accordance with known methods, for instance with 96 to 100% nitric acid, with a mixture of concentrated sulfuric acid and concentrated nitric acid, or with a mixture of nitric acid, sulfuric acid, and sulfur trioxide. In most cases, a small excess of the nitration agent is used.

After the nitration, the reaction mixture is contacted with water and the solvent. By preference a solvent is used which, in the first step of the hydrolysis, does not, or only slightly, react with nitration agent still present.

Suitable solvents are for example chloroform, carbon tetrachloride, chlorobenzene, benzene, benzylalcohol, mixtures of benzene and benzylalcohol, anisole, 2 phenoxyethanol, nitromethane and nitrobenzene. Among these nitrobenzene is to be preferred because it is a relatively good solvent for 3-nitroazacycloheptane-2-one 1-carbochloride and because it is not nitrated to any appreciable extent under the reaction conditions. Another advantage is that its boiling point is so high that the second step of the hydrolysis can, at the most suitable temperatures, be carried out under atmospheric pressure without there being any danger of evaporation of the solvent. In addition nitrobenzene is also a relatively good solvent for α-nitro ε-caprolactam.

The amount of solvent need not be larger than the amount needed for dissolving the 3-nitroazacycloheptane-2-one 1-carbochloride. In most cases, however, a small excess, of say 10%, is used.

The acidity in the first step of the hydrolysis is preferably kept at 2–5 N. However, the reaction may also be carried out in a more or less acid medium. A volume of water five or ten times that of the liquid obtained by the nitration usually suffices.

To counteract possible nitration of the solvent, the amount of water used may be increased as the excess of nitrating agent used is larger and/or the solvent is more readily nitrated. It is recommendable to use such an amount of water that the difference in specific gravity between the organic and the aqueous phases forming upon hydrolysis, is large enough to effect rapid separation of the reaction mixture in these phases.

In the first step the temperature is kept below 50° C., preferably below 20° C., to counteract nitration of the solvent and formation of α-nitro ε-caprolactam, which is less soluble in the reaction mixture. The reaction is usually completed within 10 to 30 minutes.

Thereafter the reaction mixture is separated into an aqueous and an organic phase, for instance by allowing it to stand for some time, as a result of which the liquid separates into two layers, which are drained off separately.

In the aqueous phase, which contains the bulk of the acid residues, some α-nitro ε-caprolactam formed during the hydrolysis, is generally dissolved. This substance can be extracted therefrom with an organic solvent, by preference with the same solvent as was used in the hydrolysis. The extract thus obtained can be re-used as a solvent in the first hydrolysis step. If desired, however, it can first be purified by extracting it with a solution of ammonia in water. From the resulting aqueous solution of its ammonium salt the α-nitro ε-caprolactam can be precipitated by addition of an acid or by heating, as a result of which the ammonia is expelled from the salt.

The organic phase, which mainly consists of the solvent and the 3-nitroazacycloheptane-2-one 1-carbochloride dissolved therein, is re-contacted with water and heated to a temperature above 50° C., by preference below 110° C. A temperature of 80 to 100° C. is preferred. It is recommendable to take care that the solvent cannot evaporate from the reaction vessel during heating. This has the advantage that a purer product is obtained than when the solvent is distilled off during the hydrolysis.

The amount of water used in this second hydrolysis step may widely vary. To prevent undesired side reactions, it is recommended to use at least so much water that upon completion of the hydrolysis the acidity does not exceed 2 N. An acidity of 0.5–1 N is preferred.

If desired, a base, for instance ammonium carbonate, may be added during this step to neutralize the hydrochloric acid set free and thus counteract corrosion of the reaction vessel.

The second hydrolysis step is usually completed within 10–20 minutes. A portion of the α-nitro ε-caprolactam can crystallize already during the hydrolysis, since in the solvents used it tends to dissolve much less readily than 3-nitroazacycloheptane-2-one 1-carbochloride, although the temperature in the second step is much higher than that in the first. Another portion of the α-nitro ε-caprolactam can be crystallized by cooling the reaction mixture. After the crystals have been separated from the liquid, the liquid may be separated into an aqueous and an organic phase from which the α-nitro ε-caprolactam dissolved therein can be recovered in the way outlined above. After that the solvent can be re-used, if desired after having been freed of dissolved impurities, for example by distillation. The aqueous phase may be used in the first hydrolysis step.

It is advantageous, however, to keep the α-nitro ε-caprolactam in solution both during the hydrolysis and during the subsequent phase separation. The continuous execution of the procedure can thus be simplified. The additional amount of solvent needed for this purpose on top of the amount required for dissolving the 3-nitroazacycloheptane-2-one 1-carbochloride, is preferably added, wholly or partly, in the second step.

It is preferred to use the same solvent as was used in the first step, although other solvents may also be applied, for example solvents that are miscible with the former.

In a preferred realization of the process according to the invention the organic phase obtained in the first step is contacted with water in the second step by continuously passing said organic phase successively through a hydrolysis zone and a first extraction zone and passing the water continuously and countercurrently with the organic phase, successively through the first extraction zone and the hydrolysis zone and subsequently through a second extraction zone, the α-nitro ε-caprolactam being kept in organic solution by passing an organic solvent for α-nitro ε-caprolactam continuously and countercurrently with the water successively through the second extraction zone, the hydrolysis zone and the first extraction zone. This method has several advantages. Application of the countercurrent principle permits the separation of the aqueous and organic phases to be realized continuously and in a simple manner. Moreover, the organic solution of α-nitro ε-caprolactum formed in the hydrolysis zone is freed of acids and other water-soluble substances, if any, by the water in the first extraction zone. On the other hand, α-nitro ε-caprolactam dissolved in the water is extracted therefrom by the solvent in the second extraction zone.

To avoid the use of unnecessarily large amounts of solvent it is recommendable not to perform the first extraction at a temperature lower than the hydrolysis temperature. Preferably the two operations are carried out at the same temperature. The temperature in the second extraction zone may be varied. If desired, the water issuing from this zone may be brought at the temperature prevailing in the first hydrolysis step by cooling. If this water is to be re-used in the first step, it is sufficient to extract only so much of the α-nitro ε-caprolactam from it in the second extraction zone that the formation of solid α-nitro ε-caprolactam in the first hydrolysis step is avoided.

The α-nitro ε-caprolactam can be recovered in a very pure form from the organic solution issuing from the first extraction zone. To this end the said solution is preferably extracted countercurrently with an aqueous ammonia solution, preferably at the temperature that the organic solution has on leaving said zone. In this way an aqueous solution of the ammonium salt of α-nitro ε-caprolactam is obtained.

The said solution may be used as such as starting material in the catalytic hydrogenation of α-nitro ε-caprolactam to α-amino ε-caprolactam if necessary after small amounts of the solvent that may still be present therein have been removed, for instance by passing the solution over activated charcoal. The formation of solid intermediate products in the preparation of α-amino ε-caprolactam from 2-chloroazacyclo 2,3-heptene 1-carbochloride can thus be entirely prevented.

The various extractions described above can be realized according to known methods. In these operations rotating discs or pulse columns may be used with good advantage.

*Example I*

1.94 kg. of 2-chloroazacyclo 2,3-heptene 1-carbochloride is gradually added in one hour and with intensive stirring to a mixture of 0.819 kg. of nitric acid, 1.04 kg. of sulfur trioxide, and 4.5 kg. of sulfuric acid, while the temperature is kept at 0 to 5° C. by cooling.

After that, the reaction mixture is added slowly to a mixture of 35 litres of water and 35 litres of benzene at a temperature of appr. 10° C. The total duration of the reaction is 15 minutes. After being allowed to stand for a short time, the liquid separates into two phases, the uppermost of which (the organic phase) is heated with 10 l. of water in a vessel provided with a stirrer and a reflux cooler for 15 minutes at a temperature of appr. 70° C. After that, the mixture is cooled to appr. 20° C., as a result of which α-nitro ε-caprolactam crystallizes out, which is separated by filtration. The yield amounts to 1279 g.

The mother liquor is separated into an aqueous and an organic phase, the former of which, together with the aqueous phase obtained after the first hydrolysis step, is extracted with 150 litres of benzene. The extract is added to the organic phase after which the mixture is washed with 1 litre of a 7% aqueous ammonia solution. The resulting aqueous solution of the ammonium salt of α-nitro ε-caprolactam is separated from the benzene and then heated at 89° C. under a pressure of 500 mm. Hg as a result of which a second precipitate of α-nitro ε-caprolactam is obtained. This precipitate is added to the former and the resulting mixture is washed twice with a small amount of water and dried. The total yield amounts to 1516 g., corresponding to 96%. The purity amounts 99.4 to 99.6%, the melting point is 161.5° C.

*Example II*

In a continuous process, as diagrammatically illustrated in the accompanying drawing, 1.35 kg. of 2-chloroazacyclo 2,3-heptene 1-carbochloride (indicated as "carbochloride" in the drawing) and 4.3 kg. of a nitrating acid consisting of 13.4% by weight of nitric acid, 70.5% by weight of sulphuric acid and 16.1% by weight of sulphur trioxide, were passed hourly through a nitrating reactor with a residence time of approximately 1 hour, the components being intimately mixed by stirring. The temperature in the reactor was kept at 0–5° C. by cooling. The liquid issuing from the reactor (5.65 kg. hour) together with water (14.7 kg./hour) and nitrobenzene (8.4 kg./hour) was subsequently passed through a first hydrolysis reactor provided with a stirrer, wherein the temperature was kept at 10–12° C., the residence time in the reactor being approximately 10 minutes. Thereafter, the reaction mixture was passed through a separator wherein it was separated into an aqueous phase (19 kg./hour) and an organic phase (9.75 kg./hour). The aqueous phase, which contained 0.2–0.5% of α-nitro ε-caprolactam, was extracted countercurrently with nitrobenzene (4.1 kg./hour) and the extract was returned to the first hydrolysis reactor. The organic phase was passed through a second hydrolysis reactor and subsequently through a first extraction column, while an amount of water of 6.6 kg./hour countercurrently with the organic phase was passed through the extraction column and then through the second hydrolysis reactor. In a second extraction column the water issuing from the said reactor was extracted countercurrently with nitrobenzene (4.2 kg./hour), which, subsequently, was passed in succession through the second hydrolysis reactor and the first extraction column countercurrently with the water flowing through these units. The temperature in the second hydrolysis reactor and the first extraction column was kept at 80–85° C. The temperature in the second extraction column varied from 80° C. at the end where the water was introduced to 20° C. at the other end. The carbon dioxide formed during hydrolysis in the second hydrolysis reactor was let off to the air. The aqueous phase issuing from the second extraction column (6.9 kg./hour) was fed to the first hydrolysis reactor. The organic phase issuing from the first extraction column (13.4 kg./hour) consisting of a solution of nitrocaprolactam in nitrobenzene was extracted countercurrently with water (1.45 kg./hour) and a 15% solution of ammonia in water (1.45 kg./hour). In this way 12.4 kg. of nitrobenzene/hour were recovered, which were recycled, and 3.9 kg. of a 27.2% aqueous ammoniacal solution of α-nitro ε-caprolactam (yield 96.5%).

From this solution α-nitro ε-caprolactam with a purity of 99.8% was precipitated by heating.

We claim:

1. In a process for the preparation of α-nitro ε-caprolactam by nitration of 2-chloroazacyclo 2,3-heptene 1-carbochloride and hydrolysis of the nitration product in two steps wherein 3-nitroazacycloheptane-2-one 1-carbochloride is formed in the first step and said nitro compound is hydrolized further into α-nitro ε-caprolactam, the improvement which comprises carrying out said first step in a water-immiscible organic solvent for 3-nitroazacycloheptane-2-one 1-carbochloride, after which the resulting liquid is separated into an aqueous and an organic phase, and the latter phase is re-contacted with water in the second step.

2. The process of claim 1 wherein the first step of the hydrolysis is carried out at a temperature below 20° C.

3. The process of claim 1 wherein the second step of the hydrolysis is carried out at a temperature of 80 to 100° C.

4. The process of claim 1 wherein the α-nitro ε-caprolactam formed in the second step is kept in organic solution by adding a further amount of solvent in this step.

5. The process of claim 1 wherein the organic phase obtained in the first step is contacted with water in the second step by continuously passing said organic phase successively through a hydrolysis zone and a first extraction zone, while the water, countercurrently with the organic phase, is continuously passed successively through the first extraction zone and the hydrolysis zone and thereafter through a second extraction zone, the α-nitro ε-caprolactam being kept in organic solution by continuouly passing an organic solvent for this material, countercurrently with the water, successively through the second extraction zone, the hydrolysis zone and the first extraction zone.

6. The process of claim 1 wherein nitrobenzene is used as a solvent.

No references cited.